United States Patent
Heeg et al.

(10) Patent No.: US 9,193,283 B2
(45) Date of Patent: Nov. 24, 2015

(54) ACTUATOR FOR A VEHICLE SEAT, AND VEHICLE SEAT

(75) Inventors: Norbert Heeg, Dahn (DE); Christoph Schuhn, Düsseldorf (DE); Frank Grossbudde, Wuppertal (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 162 days.

(21) Appl. No.: 13/976,402

(22) PCT Filed: Jan. 24, 2012

(86) PCT No.: PCT/EP2012/000293
§ 371 (c)(1),
(2), (4) Date: Aug. 1, 2013

(87) PCT Pub. No.: WO2012/104027
PCT Pub. Date: Aug. 9, 2012

(65) Prior Publication Data
US 2013/0305857 A1    Nov. 21, 2013

(30) Foreign Application Priority Data
Jan. 31, 2011    (DE) .......................... 10 2011 010 194

(51) Int. Cl.
*H02P 1/00*    (2006.01)
*H02P 5/00*    (2006.01)
(Continued)

(52) U.S. Cl.
CPC .............. *B60N 2/443* (2013.01); *B60N 2/0224* (2013.01); *B60N 2/0232* (2013.01); *B60N 2/366* (2013.01);
(Continued)

(58) Field of Classification Search
CPC ...... H02P 21/146; H03H 7/0115; H03H 7/06; H04L 12/10; H04L 12/4625; H04L 12/56; H04L 29/0653; H04L 45/74
USPC .............. 318/103, 280, 266, 466; 701/36, 49; 297/216.13, 217.3; 177/144
See application file for complete search history.

(56) References Cited

U.S. PATENT DOCUMENTS

| 4,257,634 A | 3/1981 | Kleefeldt et al. |
| 4,941,694 A | 7/1990 | Bartel et al. |

(Continued)

FOREIGN PATENT DOCUMENTS

| CN | 1578739 A | 2/2005 |
| CN | 1621266 A | 6/2005 |

(Continued)

OTHER PUBLICATIONS

International Search Report in PCT/EP2012/000293 dated Apr. 18, 2012.
(Continued)

*Primary Examiner* — Paul Ip
(74) *Attorney, Agent, or Firm* — Foley & Lardner LLP

(57) ABSTRACT

An actuator for a vehicle seat has a housing, a motor with a motor shaft which has at least a first direction of rotation, a gear mechanism which is connected at the output end to the motor by the motor shaft, an actuator output drive which is connected at the output end to the gear mechanism, and a control unit. The actuator output drive has an output element which can be moved in the direction of an end position from a starting position by rotation of the motor shaft in the first direction of rotation. The direction of rotation of the motor shaft can be reversed from the first direction of rotation to an opposite second direction of rotation by the control unit, with the result that the output element can be moved in the direction of the starting position from the end position.

15 Claims, 3 Drawing Sheets

(51) Int. Cl.
*H02P 3/00* (2006.01)
*B60N 2/44* (2006.01)
*B60N 2/02* (2006.01)
*B60N 2/36* (2006.01)

(52) U.S. Cl.
CPC ... *B60N 2002/024* (2013.01); *B60N 2002/0236* (2013.01); *B60N 2002/0272* (2013.01); *Y10T 74/18576* (2015.01)

(56) References Cited

U.S. PATENT DOCUMENTS

| | | | |
|---|---|---|---|
| 5,319,248 | A | 6/1994 | Endou |
| 6,243,635 | B1 * | 6/2001 | Swan et al. ............ 701/49 |
| 6,339,302 | B1 * | 1/2002 | Greenbank et al. ........ 318/103 |
| 6,788,048 | B2 * | 9/2004 | Hedayat et al. ............. 324/202 |
| 6,940,026 | B2 * | 9/2005 | Rundell et al. ............. 177/144 |
| 7,640,828 | B2 | 1/2010 | Sakamaki |
| 7,997,655 | B2 * | 8/2011 | Sakai et al. ............ 297/362.11 |
| 8,272,688 | B2 * | 9/2012 | Hashimoto et al. ........ 297/217.3 |
| 8,954,240 | B2 * | 2/2015 | Scully ............. 701/49 |
| 2001/0003806 | A1 * | 6/2001 | Swan et al. ............ 701/49 |
| 2004/0108146 | A1 * | 6/2004 | Rundell et al. ............. 177/144 |
| 2007/0056781 | A1 * | 3/2007 | Mattes et al. ............. 180/65.1 |
| 2008/0009989 | A1 * | 1/2008 | Kim et al. ............ 701/36 |
| 2009/0284062 | A1 * | 11/2009 | Sakai et al. ............. 297/354.1 |
| 2012/0032482 | A1 * | 2/2012 | Hashimoto et al. ...... 297/216.13 |
| 2012/0106350 | A1 * | 5/2012 | Yousefi et al. ............. 370/241 |

FOREIGN PATENT DOCUMENTS

| | | |
|---|---|---|
| DE | 28 19 143 A1 | 10/1979 |
| DE | 38 23 505 C2 | 1/1990 |
| DE | 10 2008 028 726 A1 | 4/2009 |
| DE | 10 2009 022 955 A1 | 12/2010 |
| JP | 55-013392 A | 1/1980 |
| JP | 04-201745 A | 7/1992 |
| JP | 2002-365011 A | 12/2002 |
| JP | 2009-045958 A | 3/2009 |
| JP | 2010-285011 A | 12/2010 |
| WO | WO 03/039905 A1 | 5/2003 |
| WO | WO-2010/066320 A1 | 7/2010 |
| WO | WO-2010/115626 | 10/2010 |

OTHER PUBLICATIONS

Office Action dated Jul. 1, 2014, in corresponding Japanese Application No. 2013-538240 and English translation, 4 pages.
Notification of Transmittal of Translation of the International Preliminary Report on Patentability mailed Aug. 15, 2013, as received in corresponding International Application No. PCT/EP2012/000293.
Office Action issued in co-pending Chinese Application No. 201280004417.4 dated Mar. 2, 2015.

* cited by examiner

ACTUATOR FOR A VEHICLE SEAT, AND VEHICLE SEAT

CROSS REFERENCE TO RELATED APPLICATIONS

The present application is a National Stage of International Application No. PCT/EP2012/000293 filed on Jan. 24, 2012, which claims the benefit of German Patent Application No. 10 2011 010 194.2 filed on Jan. 31, 2011, the entire disclosures of which are incorporated herein by reference.

The invention relates to an actuator for a vehicle seat having the features of the preamble of claim 1. The invention further relates to a vehicle seat having the features of claim 10.

PRIOR ART

An actuator of this type is disclosed in WO 2010/066320 A1. Here, mechanical, electrical (in particular electromotive) and electronic components are combined together to form a sub-assembly. In this case, various combined sub-assemblies may be used as actuators at different points of the vehicle seat. Actuators are also known in which a control unit is not integrated therein but the actuator is controlled by an external control unit, for example for limiting the current. The actuator output drive is known to permit the motor to run in just one rotational direction in order to bring the output element from the initial position into the end position and to provide a spring for returning the output element into the initial position. DE 38 23 505 C2 discloses an actuator comprising an electric motor and a spindle gear as the actuator output drive. A positioning frame serving as the output element is releasably coupled by means of spring tongues to the spindle nut of the spindle gear.

Object

The object of the invention is to improve an actuator of the type mentioned in the introduction.

Solution

This object is achieved according to the invention by an actuator having the features of claim 1. Advantageous embodiments form the subject-matter of the sub-claims.

With the integration of different functions in the actuator, a slightly greater complexity of the control unit permits a considerably lower complexity of the mechanical components. Due to the reversal of the rotational direction, a spring for returning the output element and the tensioning of the spring by the motor are dispensed with, as a result of which the motor does not need to be as powerful, which also reduces the requirements for the stability of the gear mechanism. In addition, limiting the current of the motor reduces the requirements for stability of the gear mechanism. By means of sensors, it is possible to identify the initial position and/or end position of the output element. Otherwise, the position is identified by means of the characteristic of the alteration of the parameters (current, voltage, time). If the defined end position and the actual end position do not coincide, the output element jams so that the actuator preferably returns the output element into the initial position.

Preferably, the end position of the output element identified by the sensor (and accordingly the initial position) is positioned just before the mechanical end position (block) i.e. the stop, i.e. the sensor identifies the end position before the output element is driven into the end position at full motor power, i.e. moves towards the block. The motor current is then switched off and the output element preferably reaches the mechanical end position when coming to rest. Due to the identification of the position, therefore, the loading of the stop may be markedly reduced. The motor and gear mechanism move into the blocked state considerably less. In particular, the motor is prevented from being loaded by the blocking current.

The actuator may be used with a discontinuous locking component of a vehicle seat, for example in a lock or a latching fitting or a freely pivoting device of a backrest. Said locking component is actuated by means of the actuator (more specifically the output element thereof) and thus brought from the locked state into the unlocked state (and back). The actuator may also be used with a continuous adjuster, for example a linear adjuster or a lumbar support.

FIGURES AND EMBODIMENTS OF THE INVENTION

The invention is described in more detail hereinafter with reference to an exemplary embodiment shown in the drawings, in which.

Figure 1:
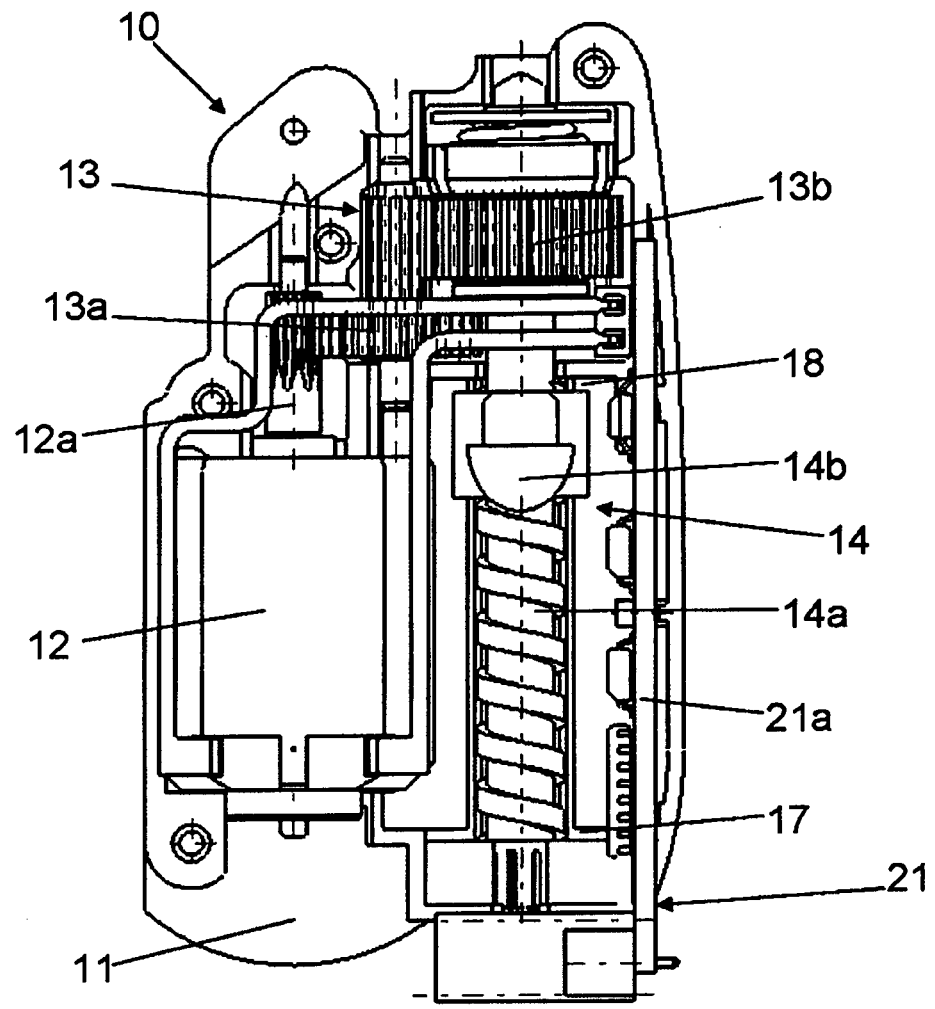
FIG. 1 shows a plan view of the exemplary embodiment.
Figure 2:
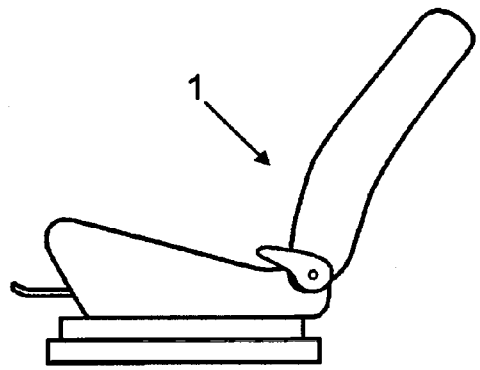
FIG. 2 shows a schematic view of a vehicle seat.
Figure 3:
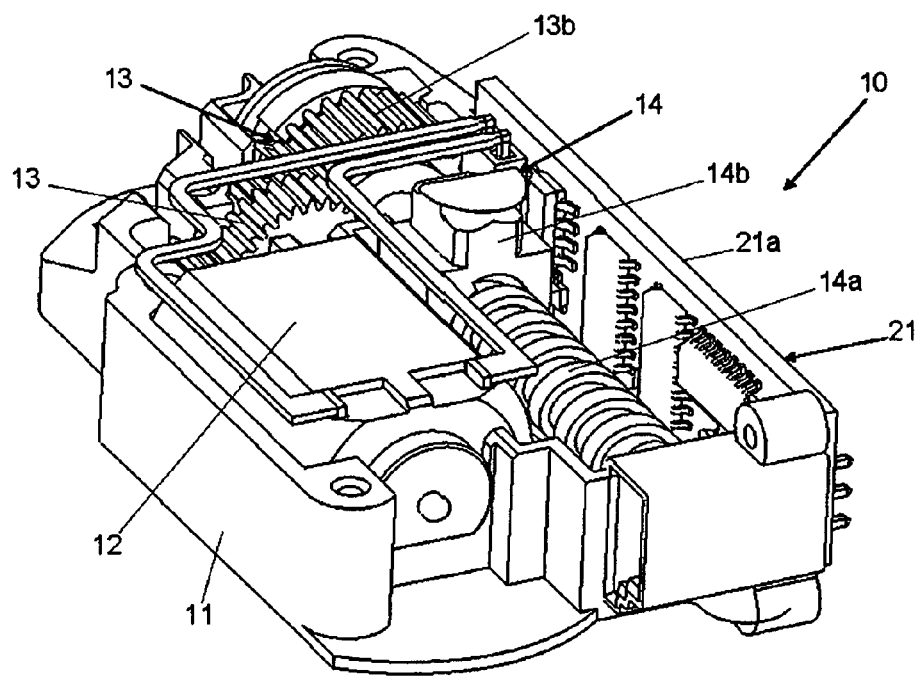
FIG. 3 shows a perspective view of the exemplary embodiment.
Figure 4:
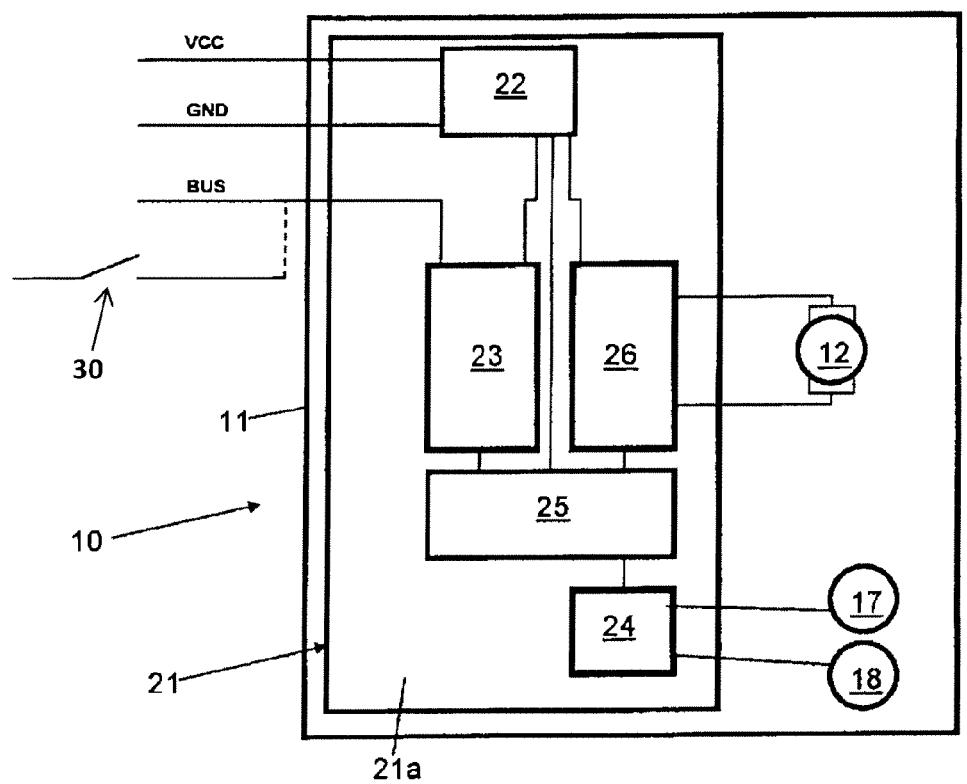
FIG. 4 shows a schematic circuit diagram of the exemplary embodiment.

A vehicle seat 1 of a motor vehicle has at least one actuator 10, by means of which a seat component may be adjusted or a function (including the opening of a locking component) may be triggered. The actuator 10 has a housing 11 within which an electric motor 12 is arranged, fixed to the housing. On the output side, a gear mechanism 13 is connected to the motor 12. More specifically, the motor shaft 12a of the motor 12 provided with a toothing meshes with a drive spur gear portion, having a greater diameter, of a first gearwheel 13a of the gear mechanism 13 which is rotatably mounted in the housing 11. An output spur gear portion of the first gearwheel 13a, having a smaller diameter, meshes with a second gearwheel 13b of the gear mechanism 13, having a greater diameter, which is also mounted in the housing 11.

On the output side, an actuator output drive 14 is connected to the gear mechanism 13 which in the present case is configured as a spindle gear. More specifically, the second gearwheel 13b configured as a spur gear is fastened to a spindle 14a—aligned therewith and located at the end thereof—which is rotatably mounted in the housing 11. The spindle 14a is arranged parallel to the motor shaft 12a. A spindle nut located on the spindle 14a cooperates with the spindle 14a, said spindle nut serving as the output element 14b of the actuator output drive 14. In its initial position, the output element 14b is arranged at the end of the spindle 14a with the second gearwheel 13b. In its end position, the output element 14b is arranged at the end of the spindle 14a remote from the second gearwheel 13b. For detecting the end position of the output element 14b, a first sensor 17 fixed to the housing is arranged on the bearing of the spindle 14a which is located at the end of the spindle 14a remote from the second gearwheel 13b. Optionally, for detecting the initial position of the output element 14b, a second sensor 18 fixed to the housing is arranged on the bearing of the spindle 14a which is located at the end of the spindle 14a with the second gearwheel 13b. The sensors 17 and 18 may be configured mechanically (for example as a microswitch), inductively (for example as a Hall sensor) or capacitively.

On one side of the housing 11, in the present case on the side of the actuator output drive 14 spatially remote from the motor 12, a control unit 21 is arranged, in the present case a printed circuit board 21*a* with a plurality of IC modules, for example logic modules, power control modules (pulse width modulation), output stages (for example full bridge stages), communication modules and components for protecting the control unit 21 against overvoltage, ESD/EMC, temperature or the like. Alternatively, all these functions are integrated in a single module which has corresponding interfaces. The printed circuit board 21*a* forms, for example, a wall of the housing 11.

The control unit 21 has an internal voltage supply 22 with two supply terminals VCC and GND, which protrude outwardly from the printed circuit board 21*a*. The control unit 21 further comprises a network interface 23 with at least one signal terminal BUS. The network interface 23 serves for communication, for example, with an LIN bus, which uses the signal terminal BUS and the supply terminal GND (earth). The network interface may alternatively serve for communication with a further data bus, for example a CAN bus, which then requires more terminals, or a further network. The control unit 21 also has a sensor interface 24 which is connected to the first sensor 17 and the optional second sensor 18. The control unit 21 comprises a logic unit 25 to which the network interface 23 and the sensor interface 24 are connected. The control unit finally has a motor control unit 26 which is connected to the logic unit 25 and controls the motor 12 and namely both with regard to the rotational direction and also with regard to current limitation. The motor control unit 26 and the logic unit 25, the network interface 23 and the sensor interface 24 are supplied with current by the internal voltage supply 22. Power transistors or the like may be provided outside the IC module for the motor control unit 26.

As a sub-assembly, the actuator 10 contains mechanical, electrical (in particular electromotive) and electronic components, so that all the necessary functions may be integrated in the actuator 10 and may be processed within the actuator 10. The communication with the vehicle seat 1 and the vehicle, in particular with actuating elements, takes place via the network interface 23, with corresponding implementation. The further functions are substantially determined by the hardware of the control unit 21. In mechanical terms, preferably the motor 12, the gear mechanism 13 and the spindle 14*a* (in each case together with the bearings) as well as the control unit 21 are entirely integrated in the housing 11.

An identification of the position—apart from by means of sensors 17 and 18, the data thereof being stored by means of the sensor interface 24—is additionally or alternatively possible by means of a measurement of the current, voltage and time. The characteristic of the alteration of these parameters may be used in order to differentiate between the output element 14*b* reaching the end position or the initial position, on the one hand, and jamming in a central position. Apart from the digital identification of the position by means of the sensors 17 and 18, a continuous identification of the position might also be possible by means of a corresponding (analogue) sensor.

The motor control unit 26 preferably has a current limiter using pulse width modulation. After exceeding a limit value for the current, which for example is measured by means of a shunt on the printed circuit board 21*a*, the voltage for the motor 12 is reduced by means of pulse width modulation, so that the motor 12 receives no more than the predefined limit value of the current. The motor control unit 26 also makes use of a reversal of the rotational direction which serves both for the return of the actuator 10 and as overload protection. In the first rotational direction of the motor shaft 12*a* the motor 12 moves the output element 14*b* from the initial position towards the end position (by means of the gear mechanism 13 and the spindle 14*a*). In the second rotational direction of the motor shaft 12*a*, which opposes the first rotational direction of the motor shaft 12*a*, the motor 12 moves the output element 14*b* from the end position back toward the initial position. Due to this return by reversing the rotational direction, couplings and springs are dispensed with, as used in the prior art. Due to the omission of the spring to be tensioned, the motor 12 does not need to be as powerful, so that the power of the motor 12 is used entirely for the application (adjusting the seat components or triggering the function). The implementation of the return by reversing the rotational direction is carried out, for example, by a full bridge with power transistors which activates the motor 12.

Proceeding from a passive state, the actuator 10 is activated (i.e. it changes into an active state) by means of a switching process which is triggered by the user on an actuating element and is preferably transmitted by means of the data bus BUS to the actuator 10. Alternatively, the activation of the actuator 10 is triggered by means of a (simple electrical) switch 30 so that the network interface 23 does not process bus protocol but only the activation signal of the switch 30. Between activating the actuator 10 and switching off the motor current (passive state) the user has no influence over the actuator 10, i.e. the network interface 23 is blocked.

The return of the actuator 10 (i.e. the return of the output element 14*b* into the initial position) may take place actively due to a switching process triggered by the operator or due to a specific position of the actuator 10. For example, when used in a discontinuous locking component by means of a switching process (for example on a switch 30 from "0" to "1") the actuator 10 may be activated for unlocking, so that the locking component opens. When the locking component is opened, the control unit 21 switches over, due to the position identification and operates the motor 12, with a reversal of the rotational direction until the output element 14*b* again reaches the initial position, and the motor 12 is switched off again due to the position identification. The actuator 10 is then in the passive state. The locking component may then be mechanically locked unhindered (by the actuator 10). Alternatively, the control unit 21 switches off the motor 12 when the locking component is opened, and only operates the motor after a switching procedure from "1" to "0", with a reversal of the rotational direction.

The reversal of the rotational direction in the event of overload preferably takes place when a mechanical overload is assumed, as a result of the position identification, in particular in a central position, i.e. when neither an initial position nor an end position of the output element 14*b* is present but the current requirement increases quickly. The motor 12 is subjected to a reversal of the rotational direction and the output element 14*b* is preferably returned to its initial position so that the actuator 10 does not remain in the jammed position.

Apart from by means of the described position identification, the actuator 10 may also obtain information about its state by means of the network connected to the network interface 23, for example whether a connected locking component is locked or not. Furthermore, it is possible to secure against a case of misuse, by luggage or children not being able to trigger a switching process. Conversely, the actuator 10 may be interrogated in its passive state for diagnostic purposes, in particular the sensors 17 and 18.

LIST OF REFERENCE NUMERALS

1 Vehicle seat
10 Actuator
11 Housing
12 Motor
12*a* Motor shaft
13 Gear mechanism
13*a* First gearwheel
13*b* Second gearwheel
14 Actuator output drive
14*a* Spindle
14*b* Output element
17 First sensor
18 Second sensor
21 Control unit
21*a* Printed circuit board
22 Internal voltage supply
23 Network interface
24 Sensor interface
25 Logic unit
26 Motor control unit
30 Switch
BUS Signal terminal of the network interface
GND Supply terminal (earth) of the internal voltage supply
VCC Supply terminal of the internal voltage supply

The invention claimed is:

1. An actuator for a vehicle seat comprising:
a housing;
a motor arranged fixed to the housing having a motor shaft, which has at least one first rotational direction;
a gear mechanism which is connected on the output side to the motor by the motor shaft;
an actuator output drive which is connected on the output side to the gear mechanism; and
a control unit,
wherein the actuator output drive has an output element which is able to be moved from an initial position into an end position by rotating the motor shaft in the first rotational direction,
wherein the rotational direction of the motor shaft is able to be reversed from the first rotational direction into an opposing second rotational direction by the control unit, so that the output element is able to be moved into the initial position from the end position,
wherein at least one first sensor detects the end position of the output element,
wherein the control unit has a sensor interface which is connected to the at least one first sensor, and
wherein an identification of the position of the output element is provided by evaluation of changes in measurements of time and at least one of current and/or voltage.

2. The actuator as claimed in claim 1, wherein the actuator output drive has a spindle rotatably mounted in the housing, wherein the output element is located on and cooperates with the spindle, wherein the output element is a spindle nut.

3. The actuator as claimed in claim 2, wherein the motor, the gear mechanism, the spindle and the control unit are entirely integrated in the housing.

4. The actuator as claimed in claim 2, wherein the spindle is arranged parallel to the motor shaft.

5. The actuator as claimed in claim 1, wherein at least one second sensor detects the initial position of the output element, wherein the sensor interface is connected to the at least one second sensor.

6. The actuator as claimed in claim 1, wherein the first sensor is fixed to the housing.

7. The actuator as claimed in claim 1, wherein the control unit has a motor control unit which controls the reversal of the rotational direction of the motor shaft and which limits the current to the motor.

8. The actuator as claimed in claim 1, wherein the control unit has a network interface for communication of the actuator with a data bus.

9. The actuator as claimed in claim 1, wherein the control unit has at least one signal terminal and two supply terminals.

10. A vehicle seat having at least one of an adjustable seat component and function which may be triggered, comprising an actuator as claimed in claim 1.

11. The actuator as claimed in claim 2, wherein the output element is movable along a length of the spindle between the initial position and the end position.

12. The actuator as claimed in claim 11, wherein the output element is closer to the gear mechanism in the initial position than in the end position.

13. The actuator as claimed in claim 2, wherein rotating the motor shaft moves the gear mechanism, wherein movement of the gear mechanism causes the spindle to move in order to move the output element between the initial position and the end position.

14. The actuator as claimed in claim 5, wherein the actuator output drive has a spindle rotatably mounted in the housing, wherein the first sensor is located on a first bearing of the spindle and the second sensor is located on a second bearing of the spindle, wherein the second sensor is closer to the gear mechanism than the first sensor.

15. The actuator as claimed in claim 1, wherein the gear mechanism has a first end and a second end, wherein the first end of the gear mechanism is connected to the motor and the second end of the gear mechanism is connected to the actuator output drive.

* * * * *